(12) United States Patent
Kritzman et al.

(10) Patent No.: US 12,342,832 B1
(45) Date of Patent: Jul. 1, 2025

(54) FISH FILLETING STAND DEVICE

(71) Applicants: Marilyn S. Kritzman, Kalamazoo, MI (US); Anthony F. Tate, Kalamazoo, MI (US)

(72) Inventors: Marilyn S. Kritzman, Kalamazoo, MI (US); Anthony F. Tate, Kalamazoo, MI (US)

( * ) Notice: Subject to any disclaimer, the term of this patent is extended or adjusted under 35 U.S.C. 154(b) by 0 days.

(21) Appl. No.: 18/399,316

(22) Filed: Dec. 28, 2023

(51) Int. Cl.
  *A22C 25/00* (2006.01)
  *A22C 25/06* (2006.01)

(52) U.S. Cl.
  CPC .................. *A22C 25/06* (2013.01)

(58) Field of Classification Search
  CPC ........ A22C 25/06; A22C 25/02; A22C 25/025
  USPC .................................. 452/194–196
  See application file for complete search history.

(56) References Cited

U.S. PATENT DOCUMENTS

| | | | |
|---|---|---|---|
| 3,093,859 A | 6/1963 | Cooper | |
| 3,445,885 A * | 5/1969 | Albert | A22C 25/06 452/195 |
| 3,503,094 A | 3/1970 | Kennedy | |
| 3,713,188 A | 1/1973 | Holladay | |
| 4,217,817 A * | 8/1980 | Meamber | A47J 37/067 452/144 |
| 4,253,650 A * | 3/1981 | Kuzio | A22C 25/08 452/149 |
| 4,977,644 A * | 12/1990 | Evans | A22C 25/06 452/132 |
| 5,376,043 A * | 12/1994 | Carter | A22C 25/06 452/65 |
| 5,522,765 A * | 6/1996 | Dotson | A22C 25/06 452/194 |
| 7,059,952 B1 * | 6/2006 | McRoberts | A22C 25/06 452/105 |
| 7,207,132 B1 * | 4/2007 | Parsons | A01K 97/045 452/194 |
| 10,827,761 B1 | 11/2020 | Graham | |
| 2005/0130575 A1 | 6/2005 | Kallas | |
| 2006/0252359 A1 * | 11/2006 | Helbing | A22B 5/06 452/194 |
| 2012/0190286 A1 * | 7/2012 | Redford | A22C 25/16 452/195 |

FOREIGN PATENT DOCUMENTS

CN     104054795     9/2014

* cited by examiner

*Primary Examiner* — Richard T Price, Jr.

(57) ABSTRACT

A fish filleting stand device for holding a fish belly-up for cleaning and filleting includes a panel having a top side that is coupled to and extends between a first end and a second end. A pair of walls is movably coupled to and extends upwardly from the panel. Each of the pair of walls is movable such that a distance between the pair of walls is adjustable. The distance between the pair of walls is adjustable to accommodate a fish that is positioned on the panel between the pair of walls. The pair of walls abuts the fish when the fish is positioned between the pair of walls. A gill post is coupled to the panel. The gill post extends upwardly from the top side. A coupler is removably couplable with the gill post. The coupler releasably retains a gill of the fish that is positioned on the panel.

18 Claims, 7 Drawing Sheets

FISH FILLETING STAND DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fish cleaning and holding devices and more particularly pertains to a new fish cleaning and holding device for holding a fish belly-up for cleaning and filleting.

(2) Description of Related Art Including Information Disclosed Under 37 CFR 1.97 and 1.98

The prior art relates to fish cleaning and holding devices. Filleting and cleaning a fish can be a difficult job, particularly for smaller fish with tiny bones or for individuals with imperfect eyesight who may have difficulty seeing the bones of the fish. Being able to position the fish belly-up while cleaning can facilitate the user in cleaning and slicing the fish open, while minimizing the risk of injury. Thus, the prior art has disclosed some devices that can clamp or otherwise hold onto a fish for cleaning and filleting. However, such devices are difficult to use for fish of different sizes because the various clamps and other fasteners are statically positioned on the device. Thus, there is a need in the art for a device that holds a fish and that is adjustable to accommodate different sizes of fish.

BRIEF SUMMARY OF THE INVENTION

An embodiment of the disclosure meets the needs presented above by generally comprising a panel having a top side that is coupled to and extends between a first end and a second end. A pair of walls is movably coupled to and extends upwardly from the panel. Each of the pair of walls is movable such that a distance between the pair of walls is adjustable. The distance between the pair of walls is configured to be adjustable to accommodate a fish that is positioned on the panel between the pair of walls. The pair of walls is configured to abut the fish when the fish is positioned between the pair of walls. A gill post is coupled to the panel. The gill post extends upwardly from the top side. A coupler is removably couplable with the gill post. The coupler is configured to releasably retain a gill of the fish to the gill post when the fish is positioned on the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
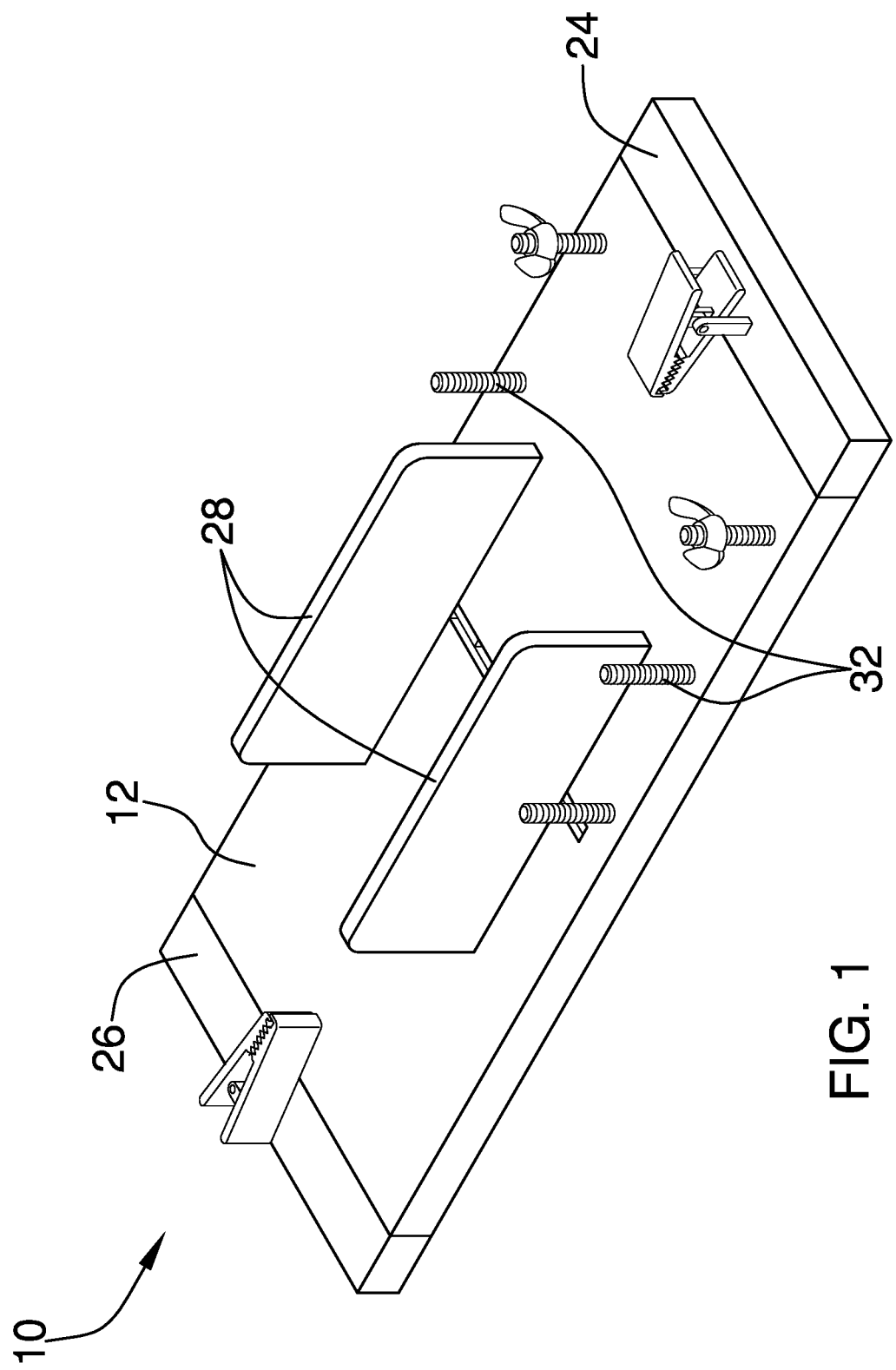
FIG. 1 is an isometric view of a fish filleting stand device according to an embodiment of the disclosure.
Figure 2:
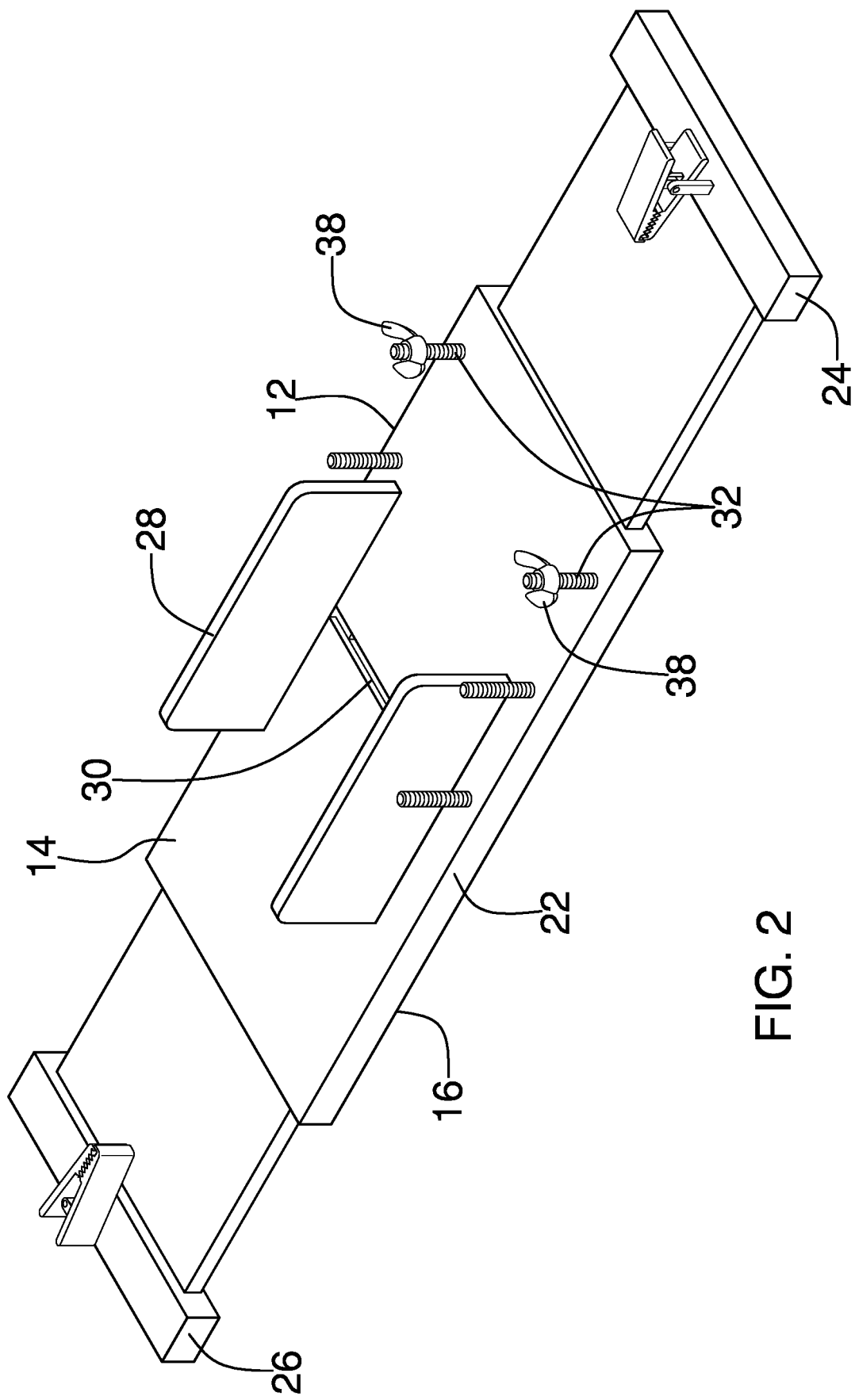
FIG. 2 is an isometric view of an embodiment of the disclosure.
Figure 3:
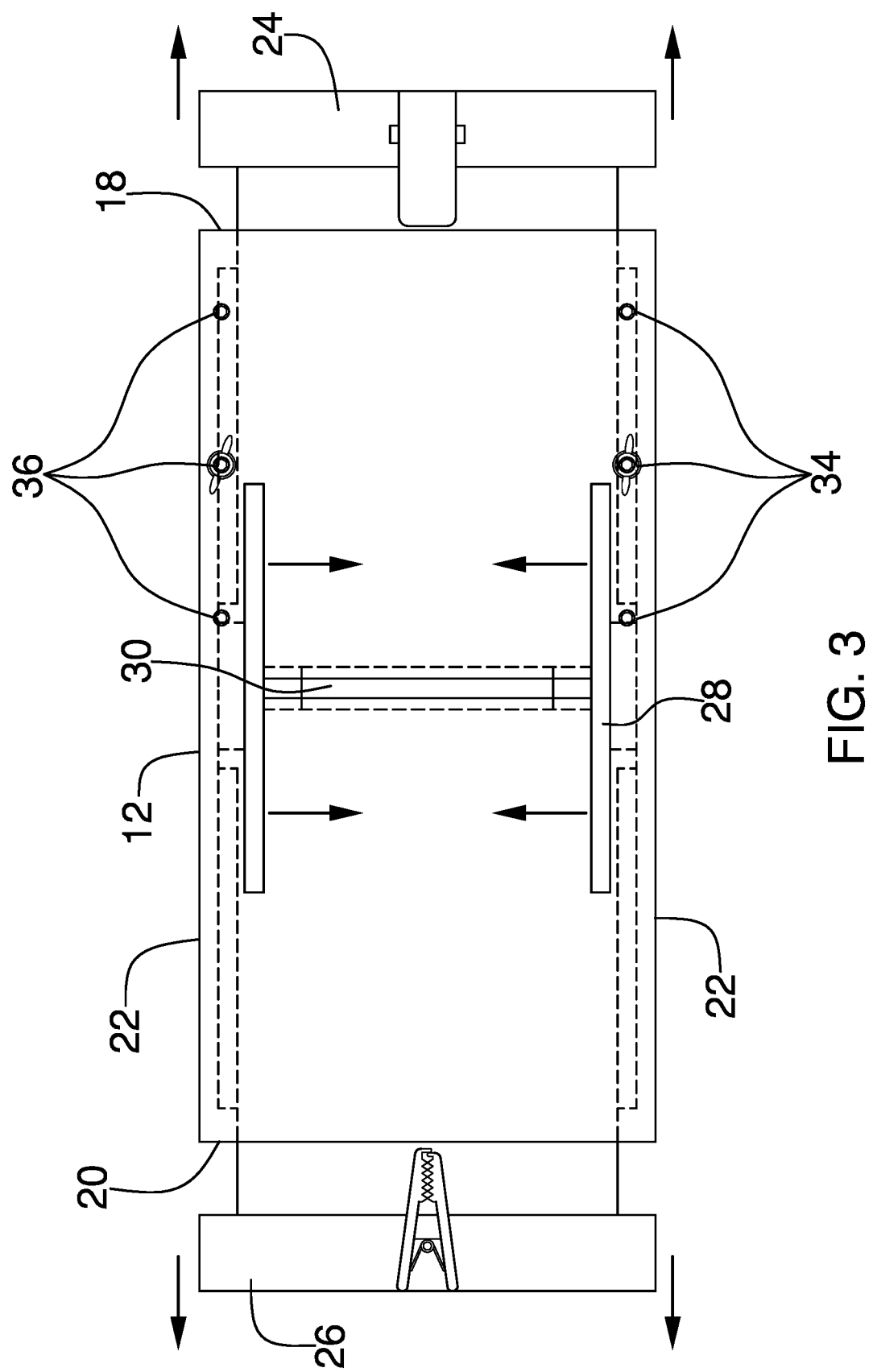
FIG. 3 is a top view of an embodiment of the disclosure.
Figure 4:
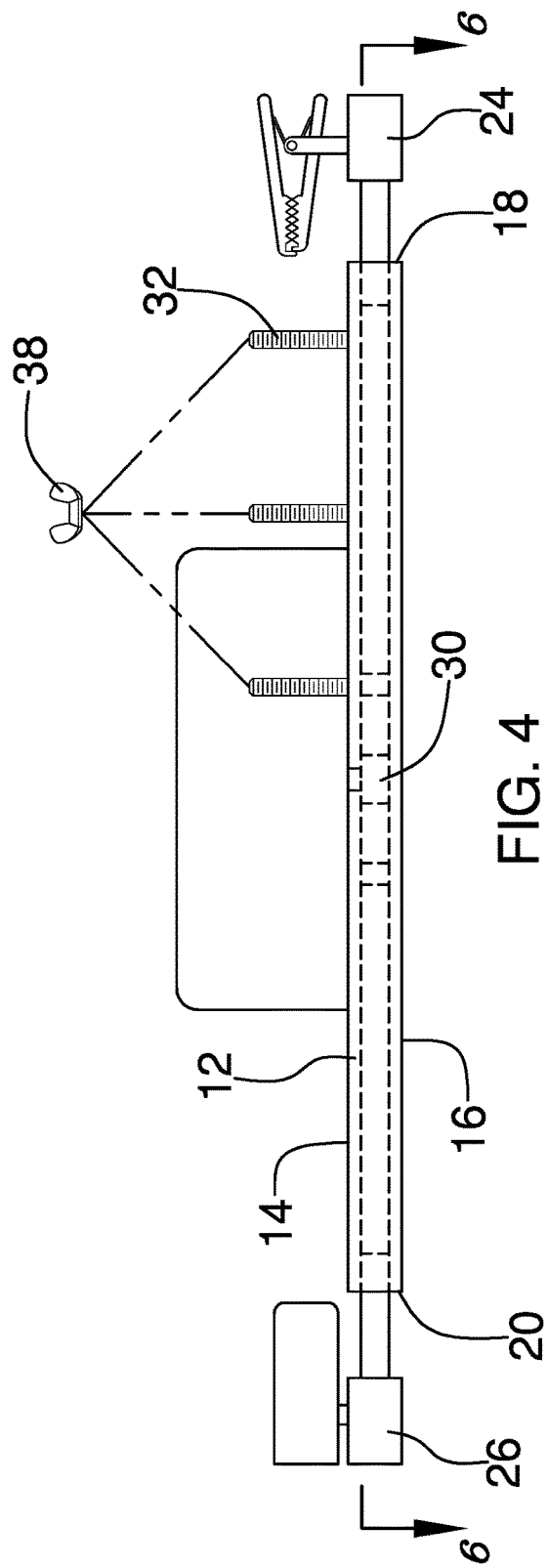
FIG. 4 is a front view of an embodiment of the disclosure.
Figure 5:
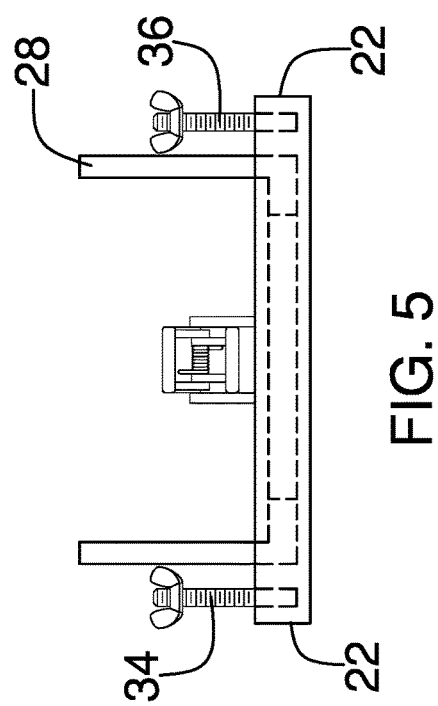
FIG. 5 is a side view of an embodiment of the disclosure.
Figure 6:
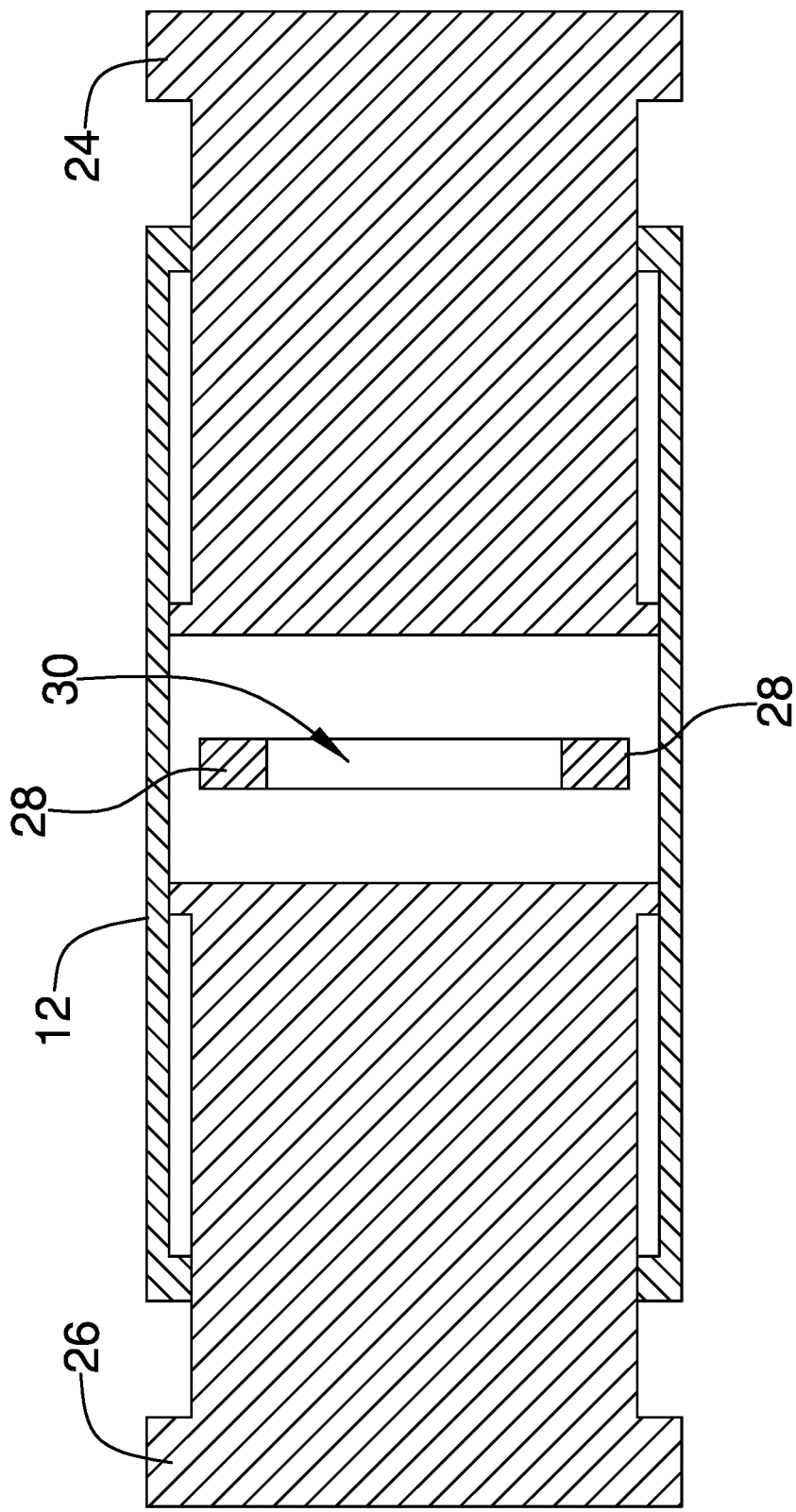
FIG. 6 is a cross-sectional view of an embodiment of the disclosure.
Figure 7:
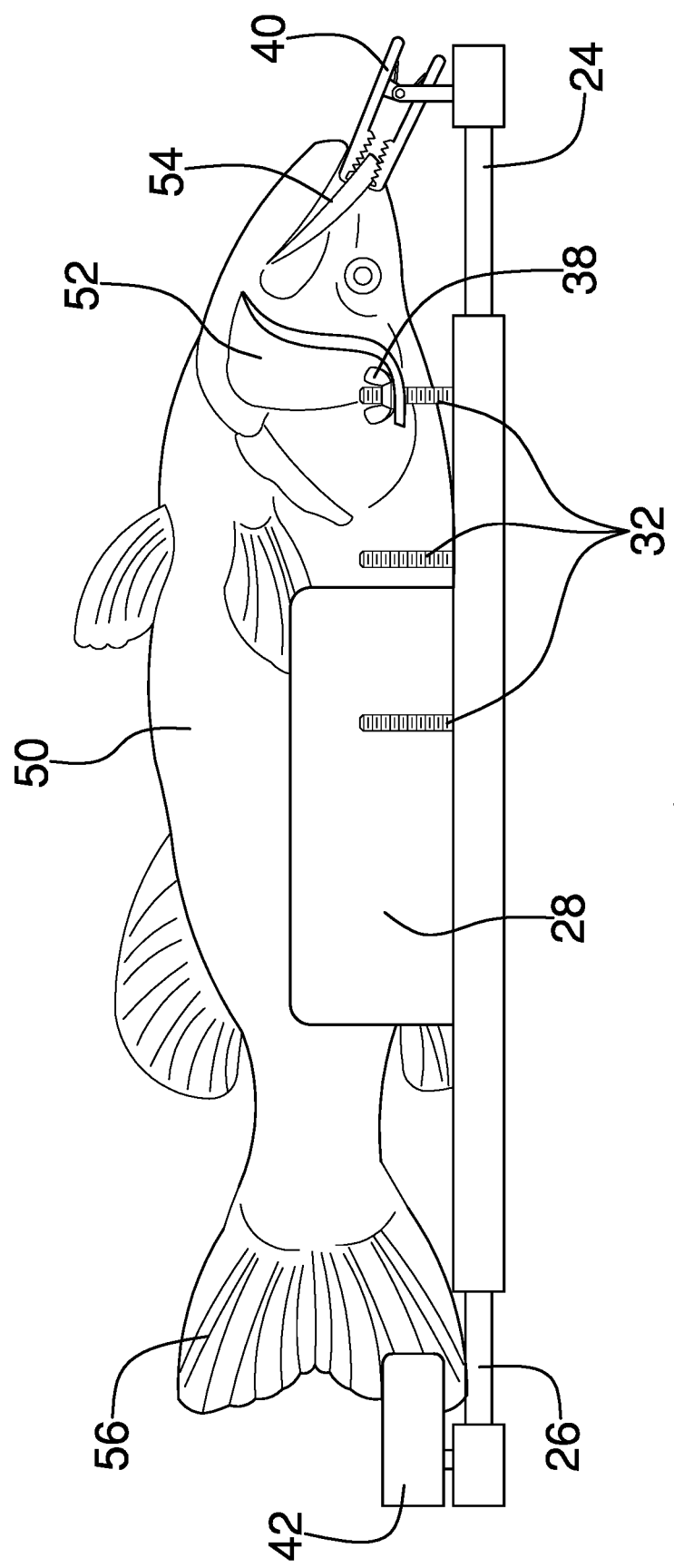
FIG. 7 is an in-use view of an embodiment of the disclosure.

With reference now to the drawings, and in particular to FIGS. 1 through 8 thereof, a new fish cleaning and holding device embodying the principles and concepts of an embodiment of the disclosure and generally designated by the reference numeral 10 will be described.

As best illustrated in FIGS. 1 through 8, the fish filleting stand device 10 generally comprises a panel 12 having a top side 14 and a bottom side 16 that are coupled to and extend between a first end 18 and a second end 20. The panel 12 generally has a pair of lateral edges 22 that are each coupled to and extend between the first end 18 and the second end 20.

A first plate 24 may be telescopically coupled to the first end 18. The first plate 24 may be nested within the panel 12 such that the first plate 24 is extendable relative to the first end 18 wherein a length of the panel 12 is increased when the first plate 24 is extended outwardly from the first end 18. The first plate 24 may have a width that is the same as a width of the panel 12.

A second plate 26 may be telescopically coupled to the second end 20. The second plate 26 may be nested within the panel 12 such that the second plate 26 is extendable relative to the second end 20 wherein the length of the panel 12 is increased when the second plate 26 is extended outwardly from the second end 20. The second plate 26 may have a width that is the same as the width of the panel 12.

For example, the length of the panel 12 may be up to 40.0 inches when the first plate 24 and the second plate 26 are each extended outwardly from a respective one of the first end 18 and the second end 20.

A pair of walls 28 may be movably coupled to and extend upwardly from the panel 12. Each wall of the pair of walls 28 may be movable such that a distance between the pair of walls 28 is adjustable. The distance between the pair of walls 28 is configured to be adjustable to accommodate a fish 50 that is positioned on the panel 12 between the pair of walls 28. The pair of walls 28 is configured to abut the fish 50 when the fish 50 is positioned between the pair of walls 28. Each of the pair of walls 28 may have a height between 1.5 inches and 3.5 inches. Each of the pair of walls 28 may have a rectangular shape.

Extension of the first plate 24 and the second plate 26 and adjustment of the distance between the pair of walls 28 can facilitate positioning differently sized fish on the panel 12, for example for cleaning or filleting.

A slot 30 may extend into the top side 14 of the panel 12. The slot 30 is generally parallel with the first end 18 and the second end 20. The slot 30 may be positioned midway between the first end 18 and the second end 20. Each of the pair of walls 28 may be slidable along the slot 30 to adjust the distance between the pair of walls 28.

A plurality of gill posts 32 is coupled to the panel 12. The plurality of gill posts 32 extend upwardly from the top side 14 of the panel 12. The plurality of gill posts 32 may be positioned between the first end 18 and the slot 30. Each post of the plurality of gill posts 32 may have a height exceeding the height of the pair of walls 28.

The plurality gill posts 32 may further comprise a first set of gill posts 34 that is aligned along the top side 14 proximate to a first one of the pair of lateral edges 22 of the panel 12. Each post of the first set of gill posts 34 may be spaced from the others. For example, the first set of gill posts 34 may include three gill posts, wherein each post of the first set of gill posts 34 is spaced from the other posts of the first set of gill posts 34 by between 1.5 inches and 2.5 inches.

A second set of gill posts 36 may be aligned along the top side 14 proximate to a second one of the pair of lateral edges 22 of the panel 12. Each post of the second set of gill posts 36 is aligned with a respective one of the first set of gill posts 34 across the top side 14 of the panel 12. For example, the second set of gill posts 36 may also include three gill posts in embodiments where the first set of gill posts 34 includes three gill posts. In alternative embodiments, each of the first set of gill posts 34 and the second set of gill posts 36 may include a single gill post, or two gill posts. The second set of gill posts 36 is generally spaced from the first set of gill posts 34.

A coupler 38 may be removably couplable with a respective one of the plurality of gill posts 32. For example, the coupler 38 may have a coupler threading and each of the plurality of gill posts 32 may have a post threading. The coupler threading is complementary to the post threading such that the coupler 38 is threadably couplable to each post of the plurality of gill posts 32. The coupler 38 is generally configured to releasably retain a gill 52 of the fish 50 to the respective one of the plurality of gill posts 32 when the fish 50 is positioned on the panel 12.

Each gill post of the plurality of gill posts 32 may be removably coupled to the panel 12. For example, the panel 12 may include a plurality of holes extending through the panel 12. Each of the plurality of holes is configured to receive a respective one of the plurality of gill posts 32. Each of the plurality of holes may have a hole threading that is complementary to the post threading such that the respective one of the plurality of gill posts 32 is threadably couplable to each of the plurality of holes.

A first clip 40 may be coupled to the first plate 24. The first clip 40 is openable along a plane that may be parallel to the top side 14 of the panel 12 wherein the first clip 40 is configured to releasably retain a mouth 54 of the fish 50 when the fish 50 is positioned on the panel 12. The first clip 40 may be positioned midway between opposing lateral ends of the first plate 24.

A second clip 42 may be coupled to the second plate 26. The second clip 42 may be aligned with the first clip 40 across the panel 12. The second clip 42 is openable along a plane that may be perpendicular to the top side 14 of the panel 12 wherein the second clip 42 is configured to releasably retain a tail 56 of the fish 50 when the fish 50 is positioned on the panel 12.

Figure 8:
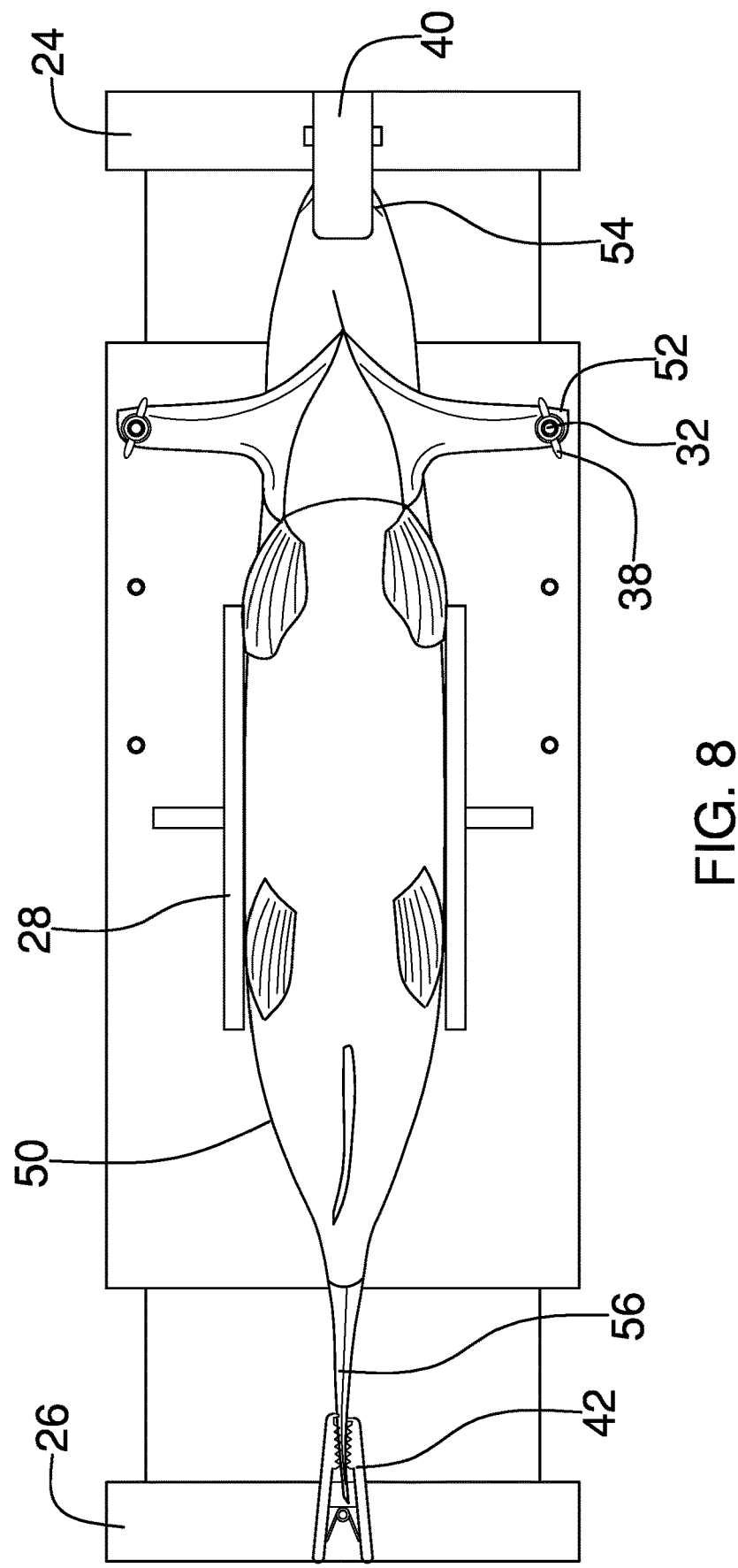
FIG. 8 is an in-use view of an embodiment of the disclosure.

In use, the fish 50 can be positioned on the panel 12 for cleaning or filleting. The fish 50 can be placed belly-up, for example, to facilitate viewing the inner portions of the fish 50 as the fish 50 is cleaned and filleted. For example, the belly-up position may help a user to see the fish 50 better than if the fish 50 were laying on its side. The pair of walls 28 can slide inwardly to abut the sides of the fish 50 as the fish 50 is laying on the panel 12. The gills 52 of the fish 50 can be draped over the plurality of gill posts 32 and secured to the panel 12 using the coupler 38. For some fish, the gills 52 may be draped over the plurality of gill posts 32 and secured to the panel 12 using the coupler 38 before the belly of the fish 50 is sliced open, as shown in FIG. 8. The mouth 54 of the fish 50 can be secured using the first clip 40 and the tail 56 of the fish 50 can be secured with the second clip 42. Because the fish filleting stand device 10 is adjustable both lengthwise and widthwise, a wide array of fish can be cleaned and filleted.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A fish cleaning board assembly comprising:
   a panel having a top side being coupled to and extending between a first end and a second end;
   a pair of walls being movably coupled to and extending upwardly from the panel, each of the pair of walls being movable such that a distance between the pair of walls is adjustable wherein the distance between the pair of walls is configured to be adjustable to accommodate a fish being positioned on the panel between the pair of walls, the pair of walls being configured to abut the fish when the fish is positioned between the pair of walls;
a gill post being coupled to the panel, the gill post extending upwardly from the top side; and
a coupler being removably couplable with the gill post, the coupler being configured to releasably retain a gill of the fish to the gill post when the fish is positioned on the panel.

2. The fish cleaning board assembly of claim 1, wherein the gill post has a height exceeding a height of each of the pair of walls.

3. The fish cleaning board assembly of claim 1, further comprising a first plate being telescopically coupled to the first end, the first plate being nested within the panel such that the first plate is extendable relative to the first end wherein a length of the panel is increased when the first plate is extended outwardly from the first end.

4. The fish cleaning board assembly of claim 3, further comprising a first clip being coupled to the first plate, the first clip being openable along a plane being parallel to the top side of the panel wherein the first clip is configured to releasably retain a mouth of the fish when the fish is positioned on the panel.

5. The fish cleaning board assembly of claim 3, further comprising a second plate being telescopically coupled to the second end, the second plate being nested within the panel such that the second plate is extendable relative to the second end wherein the length of the panel is increased when the second plate is extended outwardly from the second end.

6. The fish cleaning board assembly of claim 5, wherein the length of the panel is up to 40.0 inches when the first plate and the second plate are each extended outwardly from a respective one of the first end and the second end.

7. The fish cleaning board assembly of claim 5, further comprising:
a first clip being coupled to the first plate, the first clip being openable along a plane being parallel to the top side of the panel wherein the first clip is configured to releasably retain a mouth of the fish when the fish is positioned on the panel; and
a second clip being coupled to the second plate, the second clip being openable along a plane being perpendicular to the top side of the panel wherein the second clip is configured to releasably retain a tail of the fish when the fish is positioned on the panel.

8. The fish cleaning board assembly of claim 1, wherein each of the pair of walls has a height between 1.5 inches and 3.5 inches.

9. The fish cleaning board assembly of claim 1, wherein each of the pair of walls having a rectangular shape.

10. The fish cleaning board assembly of claim 1, further comprising a slot extending into the top side, the slot being parallel with the first end and the second end, wherein each of the pair of walls is slidable along the slot to adjust the distance between the pair of walls.

11. The fish cleaning board assembly of claim 10, wherein the slot is positioned midway between the first end and the second end.

12. The fish cleaning board assembly of claim 1, the gill post further comprising a plurality of gill posts.

13. The fish cleaning board assembly of claim 12, each gill post of the plurality of gill posts having a height exceeding a height of the pair of walls.

14. The fish cleaning board assembly of claim 12, the plurality of gill posts further comprising
a first set of gill posts being aligned along the top side proximate to a first lateral edge of the panel; and
a second set of gill posts being aligned along the top side proximate to a second lateral edge of the panel, each post of the second set of gill posts being aligned with a respective one of the first set of gill posts across the top side of the panel.

15. The fish cleaning board assembly of claim 14, wherein each post of the first set of gill posts is spaced from the other posts of the first set of gill posts by between 1.5 inches and 2.5 inches.

16. The fish cleaning board assembly of claim 1, the coupler having a coupler threading, the gill post having a post threading, the coupler threading being complementary to the post threading such that the coupler is threadably couplable to the gill post.

17. The fish cleaning board assembly of claim 1, wherein the gill post is removably coupled to the panel.

18. A fish cleaning board assembly comprising:
a panel having a top side and a bottom side being coupled to and extending between a first end and a second end, the panel having a pair of lateral edges being coupled to and extending between the first end and the second end;
a first plate being telescopically coupled to the first end, the first plate being nested within the panel such that the first plate is extendable relative to the first end wherein a length of the panel is increased when the first plate is extended outwardly from the first end, the first plate having a width being the same as a width of the panel;
a second plate being telescopically coupled to the second end, the second plate being nested within the panel such that the second plate is extendable relative to the second end wherein the length of the panel is increased when the second plate is extended outwardly from the second end, the second plate having a width being the same as the width of the panel;
the length of the panel being up to 40.0 inches when the first plate and the second plate are each extended outwardly from a respective one of the first end and the second end;
a pair of walls being movably coupled to and extending upwardly from the panel, each of the pair of walls being movable such that a distance between the pair of walls is adjustable wherein the distance between the pair of walls is configured to be adjustable to accommodate a fish being positioned on the panel between the pair of walls, the pair of walls being configured to abut the fish when the fish is positioned between the pair of walls, each of the pair of walls having a height between 1.5 inches and 3.5 inches, each of the pair of walls having a rectangular shape;
a slot extending into the top side, the slot being parallel with the first end and the second end, the slot being positioned midway between the first end and the second end, wherein each of the pair of walls is slidable along the slot to adjust the distance between the pair of walls;
a plurality of gill posts being coupled to the panel, the plurality of gill posts extending upwardly from the top side, the plurality of gill posts being positioned between the first end and the slot, the plurality gill posts further comprising:

a first set of gill posts being aligned along the top side proximate to a first one of the pair of lateral edges, each post of the first set of gill posts being spaced from the others;

the first set of gill posts including three gill posts;

wherein each post of the first set of gill posts is spaced from the other posts of the first set of gill posts by between 1.5 inches and 2.5 inches;

a second set of gill posts being aligned along the top side proximate to a second one of the pair of lateral edges, each post of the second set of gill posts being aligned with a respective one of the first set of gill posts across the top side;

the second set of gill posts including three gill posts;

a coupler being removably couplable with a respective one of the plurality of gill posts, the coupler having a coupler threading, each of the plurality of gill posts having a post threading, the coupler threading being complementary to the post threading such that the coupler is threadably couplable to each post of the plurality of gill posts, the coupler being configured to releasably retain a gill of the fish to the respective one of the plurality of gill posts when the fish is positioned on the panel;

a first clip being coupled to the first plate, the first clip being openable along a plane being parallel to the top side of the panel wherein the first clip is configured to releasably retain a mouth of the fish when the fish is positioned on the panel, the first clip being positioned midway between opposing lateral ends of the first plate; and a second clip being coupled to the second plate, the second clip being aligned with the first clip across the panel, the second clip being openable along a plane being perpendicular to the top side of the panel wherein the second clip is configured to releasably retain a tail of the fish when the fish is positioned on the panel.

* * * * *